US012500342B2

(12) United States Patent
Kenkel et al.

(10) Patent No.: US 12,500,342 B2
(45) Date of Patent: Dec. 16, 2025

(54) QUADRATURE ANTENNA FOR PORTABLE WIRELESS APPLICATIONS

(71) Applicant: Shure Acquisition Holdings, Inc., Niles, IL (US)

(72) Inventors: Mark Allen Kenkel, Schaumburg, IL (US); Charles V. Wiseman, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 502 days.

(21) Appl. No.: 17/884,147

(22) Filed: Aug. 9, 2022

(65) Prior Publication Data

US 2023/0114125 A1 Apr. 13, 2023

Related U.S. Application Data

(60) Provisional application No. 63/236,284, filed on Aug. 24, 2021.

(51) Int. Cl.
*H01Q 1/22* (2006.01)
*H01Q 1/27* (2006.01)
(Continued)

(52) U.S. Cl.
CPC ......... *H01Q 9/0421* (2013.01); *H01Q 1/2291* (2013.01); *H01Q 1/273* (2013.01);
(Continued)

(58) Field of Classification Search
CPC ........ H01Q 9/0421; H01Q 1/22; H01Q 1/243; H01Q 5/30-35; H01Q 21/30; H01Q 1/24; H01Q 1/48; H01Q 1/52; H01Q 21/24
See application file for complete search history.

(56) References Cited

U.S. PATENT DOCUMENTS 6,483,463 B2 * 11/2002 Kadambi ............... H01Q 21/24 343/702
7,161,543 B2 1/2007 Cheng et al.
(Continued)

FOREIGN PATENT DOCUMENTS

CN 202282458 U 6/2012
EP 2346113 A2 7/2011
(Continued)

OTHER PUBLICATIONS

Nov. 7, 2022—(WO) International Search Report and Written Opinion—App PCT/US2022/074807.

*Primary Examiner* — Hasan Islam
(74) *Attorney, Agent, or Firm* — Banner & Witcoff, Ltd.

(57) ABSTRACT

An antenna assembly for a wireless apparatus (such as a wireless microphone apparatus) comprises two inverted-F antennas. The antenna assembly may be formed from a single stamped sheet metal piece to facilitate manufacturing, which may allow the relative orientation of the two antennas to be reliably maintained. Moreover, manufacturing of the wireless apparatus may be simplified since one antenna assembly rather than two separate antennas may be connected to a printed circuit board of the apparatus. The two inverted-F antennas of the antenna assembly may have a common grounding element that joins the two inverted-F antennas and connects the two antennas to a ground plane of a printed circuit board, where the grounding element of the antenna assembly may be shaped to accommodate a corner of the printed circuit board that the antenna assembly is mounted to.

25 Claims, 11 Drawing Sheets

(51) Int. Cl.

| | |
|---|---|
| ***H01Q 9/04*** | (2006.01) |
| ***H01Q 21/24*** | (2006.01) |
| ***H01Q 21/30*** | (2006.01) |
| ***H01Q 25/00*** | (2006.01) |

(52) U.S. Cl.

CPC ............. *H01Q 21/24* (2013.01); *H01Q 21/30* (2013.01); *H01Q 25/00* (2013.01)

(56) References Cited

U.S. PATENT DOCUMENTS

| | | | | |
|---|---|---|---|---|
| 7,372,406 | B2 | 5/2008 | Shiotsu et al. | |
| 8,350,764 | B2 | 1/2013 | Rao et al. | |
| 8,390,519 | B2 * | 3/2013 | Wang ..................... | H01Q 9/045<br>343/702 |
| 8,654,032 | B2 * | 2/2014 | Yoon ...................... | H01Q 1/521<br>343/810 |
| 8,730,110 | B2 | 5/2014 | Rao | |
| 9,190,728 | B2 | 11/2015 | Cheng et al. | |
| 9,379,432 | B2 | 6/2016 | Ishikawa et al. | |
| 9,620,867 | B2 | 4/2017 | Hamabe | |
| 2009/0073047 | A1 | 3/2009 | Le Bolzer et al. | |
| 2011/0163922 | A1 * | 7/2011 | Wang ..................... | H01Q 1/521<br>343/702 |

FOREIGN PATENT DOCUMENTS

| | | | |
|---|---|---|---|
| JP | 2002124883 | A | 4/2002 |
| JP | 2003338783 | A | 11/2003 |
| WO | 2008014762 | A1 | 2/2008 |
| WO | 2018180877 | A1 | 10/2018 |

* cited by examiner

303

306

QUADRATURE ANTENNA FOR PORTABLE WIRELESS APPLICATIONS

This application claims priority to provisional Application No. 63/236,284 filed Aug. 24, 2021, which is incorporated by reference in its entirety herein.

BACKGROUND

With the incorporation of integration circuits (ICs), electronic circuits are becoming smaller and smaller. This observation corresponds to Moore's Law that refers to the observation that the number of transistors on a microchip approximately doubles every two years. However, while Moore's Law applies to certain types of electronic circuitry, it does not apply to antenna technology.

In relation to wireless apparatuses, while the electronic circuitry for transmitting and receiving electronic signals are continuously shrinking, those signals must be conveyed over wireless communication channels through an antenna structure. In order for a wireless apparatus to benefit from the advances in electronic circuitry, the corresponding antenna structure must conform to the reduced space of the wireless apparatus. Consequently, a compact antenna structure is important to advancing wireless technology.

SUMMARY

This summary is provided to introduce a selection of concepts in a simplified form that are further described below in the Detailed Description. This Summary is not intended to identify key features or essential features of the disclosure.

According to some aspects of the present disclosure, an antenna assembly may comprise two inverted-F antennas that may be formed from a single conductive part, which may be a single stamped metal part. The two inverted-F antennas may operate at the same frequency band or different frequency bands (for example, centered around 2.4 GHz and 5.8 GHz, which may or may not overlap.

According to further aspects of the disclosure, an antenna assembly may comprise two planar inverted-F antennas. The antenna assembly's footprint on a printed circuit board (PCB) of a wireless apparatus may be reduced by placing the antenna assembly outside the perimeter of the PCB and perpendicular to the PCB.

According to further aspects of the disclosure, an electronic circuit such as a wireless microphone transmitter and/or receiver may be connected to two quadrature inverted-F antennas (oriented at approximate right angles to each other) of an antenna assembly, thus providing wireless transmission and/or reception diversity capability.

According to further aspects of the disclosure, first and second electronic circuits may be separately connected to a first and second inverted-F antennas, respectively, of an antenna assembly. For example, the first electronic circuit may support a wireless microphone while the second electronic circuit may support an associated wireless camera. The first and/or second electronic circuit may be located on a printed circuit board of a wireless apparatus, on the wireless apparatus, or exterior to the wireless apparatus. The first and second electronic circuits may operate in the same frequency band (but on different frequency channels) or in different frequency bands.

According to further aspects of the disclosure, an antenna assembly of a wireless apparatus may provide two independent antennas with quadrature polarization. When the wireless apparatus is held at different orientations, first and second antennas may be horizontally and vertically polarized as desired, respectively.

According to further aspects of the disclosure, two inverted-F antennas of an antenna assembly may have a common grounding element (node) that joins the two inverted-F antennas and connects the two antennas to a ground plane of a printed circuit board. The grounding element of the antenna assembly may be shaped to accommodate a corner of the printed circuit board.

According to further aspects of the disclosure, a planar element of an inverted-F antenna in an antenna assembly may extend to a surface of a printed circuit board that the antenna assembly is attached to.

According to further aspects of the disclosure, the feed impedance of each of a plurality of antennas of an antenna assembly may be independently adjusted by determining and/or modifying the spacing between a planar element of each antenna and the ground plane of a printed circuit board to which the antennas are attached. For example, a section (e.g., a foil section) of the ground plane may be removed adjacent to each planar element, where the size and/or shape of the removed section for each antenna may be determined based on the desired feed impedance for that antenna.

These and other aspects will be described in Detailed Description below with reference to the various drawings.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

As will be explained below, an antenna assembly for a wireless apparatus (such as a wireless receiver or wireless microphone apparatus) may comprise two inverted-F antennas. (An inverted-F antenna roughly corresponds to a shape of an inverted letter "F" and comprises a monopole antenna running parallel to a ground plane and grounded at one end. The inverted-F antenna is typically fed from an intermediate point at a distance from the grounded end.) The antenna assembly may be formed from a single continuous conductive element, such as a single stamped sheet metal piece, to facilitate manufacturing. In addition, since the two inverted-F antennas may be formed from the same piece, the relative orientation between the two antennas may be maintained regardless of the orientation of the wireless apparatus (or any portion thereof such as a printed circuit board) that comprises the antennas or that is connected to the antennas. Moreover, manufacturing of the wireless apparatus may be simplified since such a single-piece antenna assembly, rather than two separate antennas, may be inserted into or connected to a printed circuit board of the apparatus.

Figure 1:
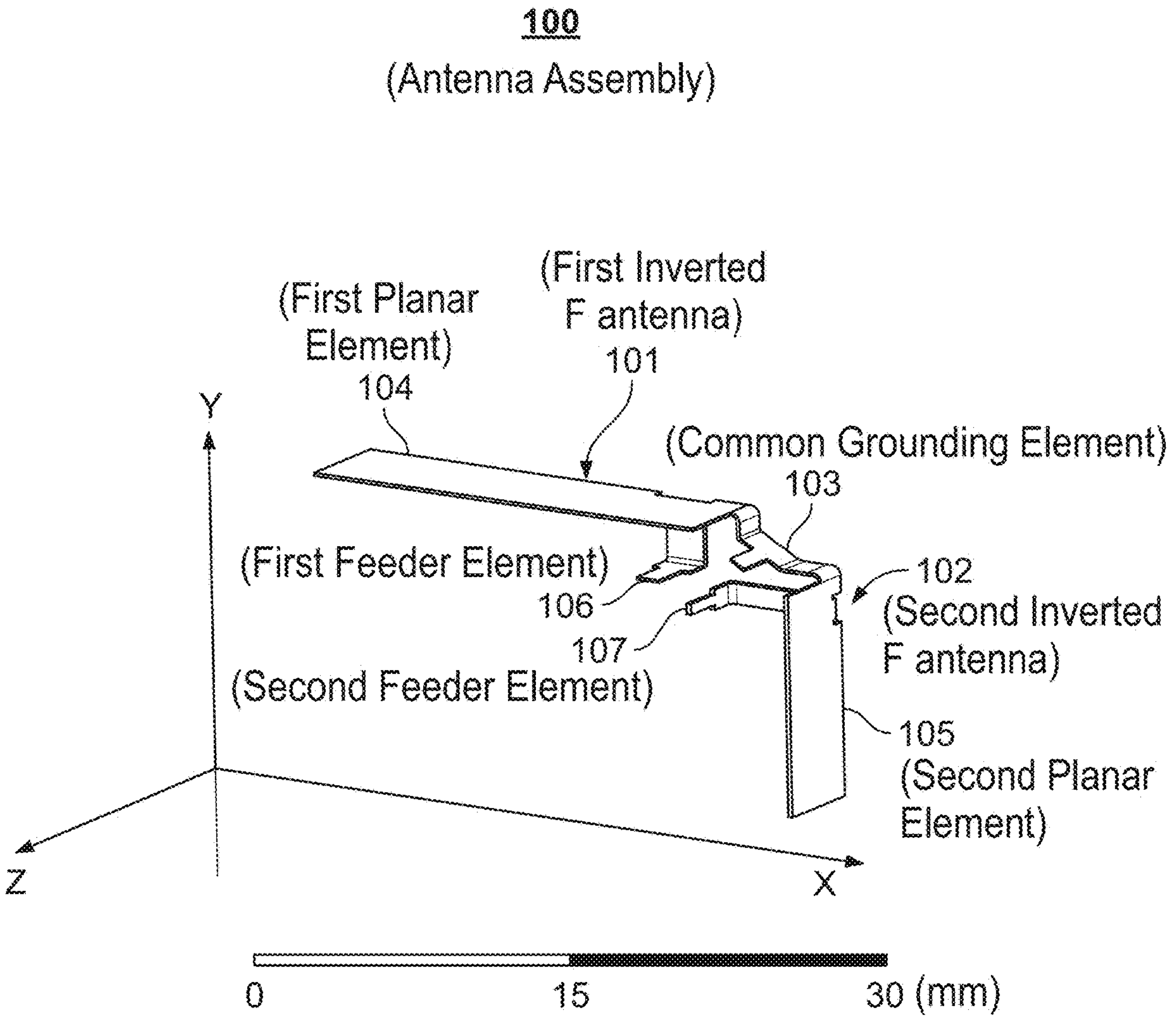
FIG. 1 shows an example of an antenna assembly that may be incorporated in a wireless apparatus in accordance with one or more aspects described herein.

FIG. 1 shows an example antenna assembly 100 that may be incorporated in a wireless apparatus. Antenna assembly 100 may comprise first and second inverted-F antennas 101 and 102, which may comprise first planar element 104 and first feeder element 106, and second planar element 105 and second feeder element 107, respectively. Antennas 101 and 102 may share common grounding element 103. First and second planar elements 104 and 105 lie on first and second planes, respectively, that may be perpendicular to each other.

Figure 3:
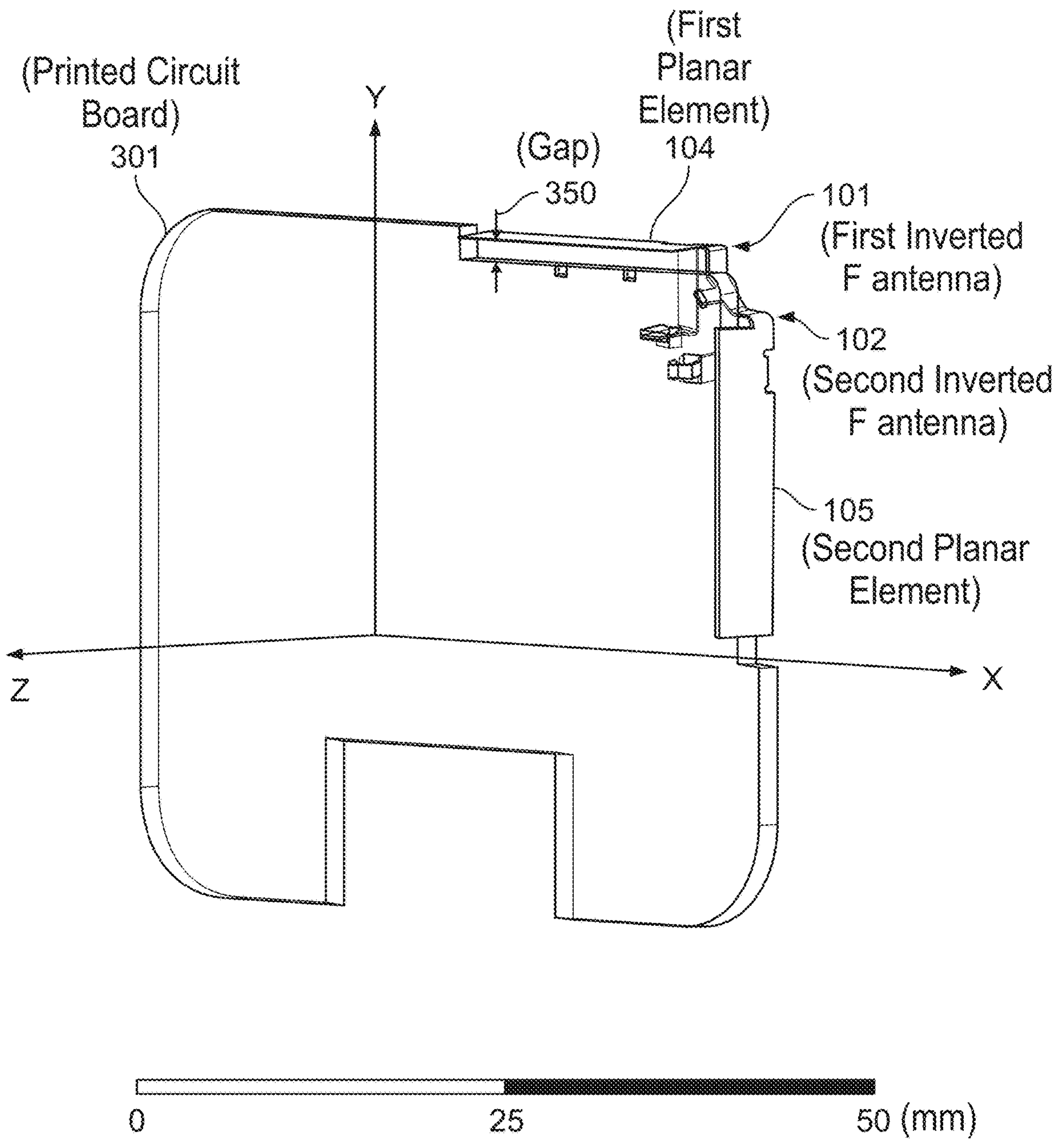
FIG. 3 shows an example of a printed circuit board in an upright orientation with the antenna assembly shown in FIG. 1 in accordance with one or more aspects described herein.

First and second planar elements 104 and 105 may have an approximate length of λ/4, where λ is the wavelength of intended operation. An example, as shown in FIG. 3, will be presented for frequencies suitable for Bluetooth® services. However, first and second inverted-F antennas may operate at any two different frequency bands; consequently, the lengths of planar elements 104 and 105 may be different. Moreover, the two antennas may operate at the same frequency bands if desired, in which case the lengths of the planar elements 104 and 105 may be substantially the same.

As will be discussed, first planar element 104 and second planar element 105 may be designated as first and second upper arms (which may be referred to as upper arms), respectively. As will be discussed, when the antennas 101 and 102 are attached to (e.g., installed in) a corresponding printed circuit board, generated signals may be fed into first and second feeder elements 106 and 107. Common grounding element 103 may be connected to a ground plane of the printed circuit board.

First inverted-F antenna 101 and second inverted-F antenna 102 may be configured to operate in overlapping different frequency bands, in non-overlapping different frequency bands, or in the same frequency band. For example, when operating in overlapping frequency bands but operating on different frequency channels, one of the inverted-F antennas may support WiFi® at 2.4 GHz while the other may support Bluetooth® services at 2.4 GHz. As another example, one of the inverted-F antennas may support Bluetooth operation at 2.4 GHz while the other inverted-F antenna supports WiFi operation at 5.8 GHz. However, antenna assembly 100 may be configured to support any other frequency bands, for example, 2.4 GHz, 3.6 GHz, 4.9 GHZ, 5 GHz, 5.9 GHZ, and/or 6 GHz.

First and second inverted-F antennas 101 and 102 may be adjusted independently to form antennas that operate in desired frequency bands by appropriately configuring the antenna feed points along planar elements 104 and 105 and the length of planar elements 104 and 105.

Figure 2:
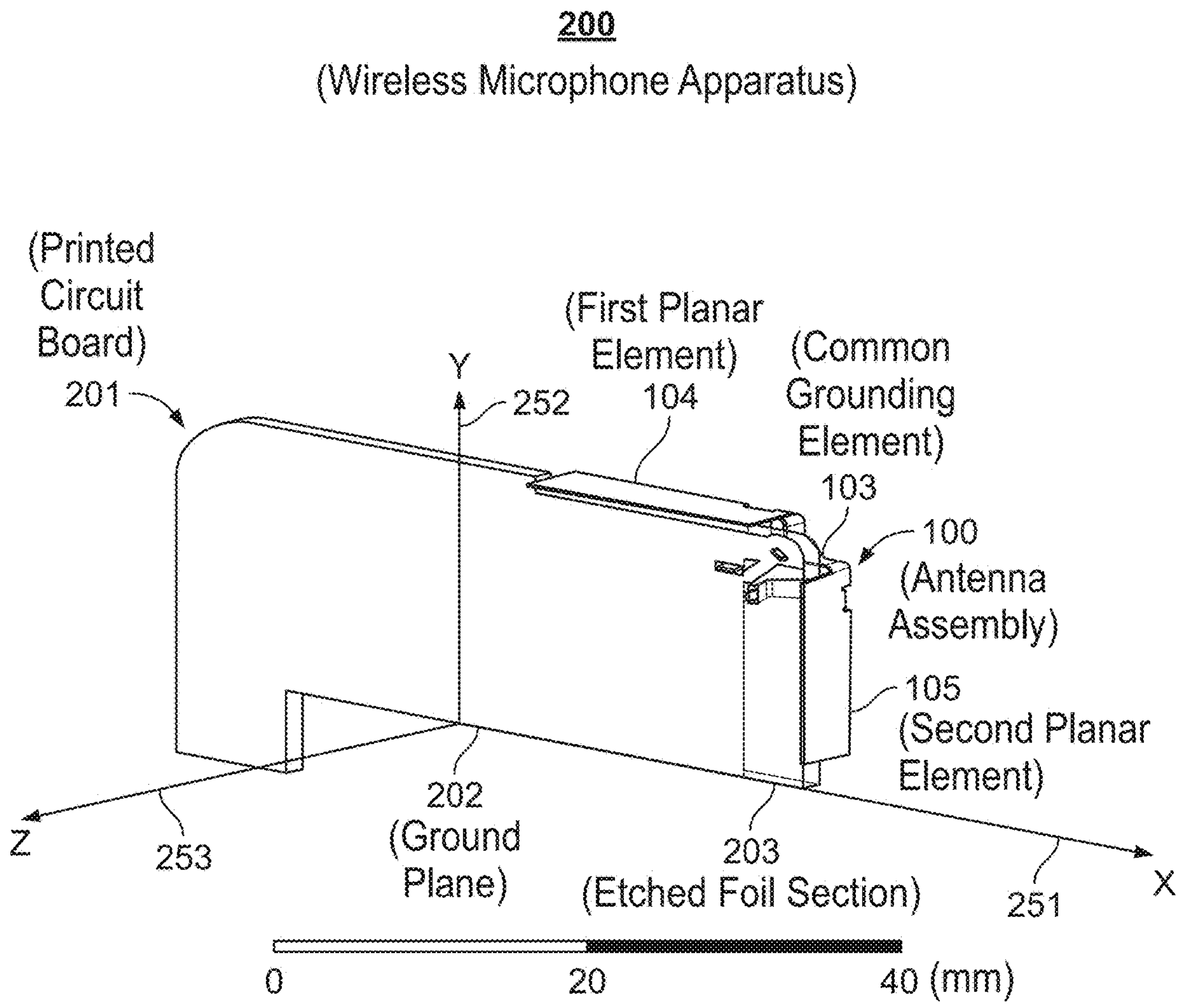
FIG. 2 shows an example of a wireless apparatus that incorporates the antenna assembly shown in FIG. 1 in accordance with one or more aspects described herein.

The operating frequency of antenna 101 and 102 may be adjusted by changing the length of planer elements 104 and 105, respectively, where a longer length corresponds to a lower frequency. Changing the length may also change the antenna feed impedance. To correct (compensate for) the impedance change, the distance between the feed (corresponding to feeder elements 106 and 107) and the ground leg (corresponding to common grounding element 103) may be adjusted. A shorter distance provides a smaller shunt inductance at the feed. Shunt capacitance at the feed may be adjusted by changing the distance between the antenna's planer element 104,105 and the ground plane provided by ground plane 202 as shown in FIG. 2. Reducing the distance increases shunt capacitance. Reducing the length of planer element 104,105 also reduces shunt capacitance. Increasing the width of the planer element may increase shunt capacitance without changing the antenna frequency. When changing the length of antenna 101,102, the feed location and distance of the planer element to the ground plane are usually both adjusted to compensate for the change to the antenna's feed impedance.

First and second inverted-F antennas 101 and 102 may support the same frequency bands for providing diversity capability for a wireless apparatus such as a wireless microphone or wireless receiver.

Antennas 101 and 102 may support different wireless applications over a wireless channel having a receive path and/or a transmit path. For example, a wireless apparatus may comprise a wireless receiver that receives a wireless signal via antennas 101 and 102, where the wireless signal conveys audio content. The wireless apparatus may then provide the audio content to an audio input of a camera. As another example, a wireless apparatus may support a wireless microphone comprising a wireless transmitter that transmits (generates) a wireless signal via antennas 101 and 102 to a wireless microphone system.

FIG. 2 shows an example wireless apparatus 200 that incorporates the antenna assembly 100 shown in in FIG. 1, where antenna assembly 100 is mounted on a printed circuit board (PCB) 201 of wireless apparatus 200.

Planar elements 104 and 105 may each abut or otherwise be adjacent to a parallel edge of PCB 201 and may extend beyond the parallel edge of PCB 201. Also, common grounding element 103 may be shaped (e.g., curved) to accommodate the corner of PCB 201 and/or apparatus housing.

The PCB 201 footprint of antenna assembly 100 may be reduced by placing the antenna assembly 100 outside the perimeter of PCB 201 and abutting a parallel edge of PCB 201. However, in accordance with traditional approaches, space may be needed on a PCB when antenna components are printed on the PCB. Further space reduction may be achieved by joining first and second inverted-F antennas 101 and 102 together at common grounding element 103, creating two antennae from one metal piece.

Common grounding element 103 may assume different shapes to conform to a component of wireless apparatus 200 such as PCB 201. For example, as shown in FIG. 2, common grounding element 103 is curved to accommodate the curved corner of PCB 201. As another example, referring to FIG. 4, common grounding element 403 may have a sharp bend in order to conform to a corner of a printed circuit board of a wireless apparatus.

The shape of common grounding element 103 typically affects the feed impedance of antennas 101 and 102, As previously discussed, for example, the impedance may be corrected by adjusting the feed location, distance between the planar element and the ground plane, and/or width of the planar element.

Using the example antenna assemblies disclosed herein, wireless apparatus 200 may have a reduced product size and/or cost with respect to traditional approaches while maintaining high antenna efficiency and adding diversity radiation performance. Higher antenna efficiency may be obtained by incorporating higher Q components with respect to printed circuit components in accordance with traditional approaches.

Antenna assembly 100 may support two independent antennas 101 and 102 with quadrature polarization. Quadrature polarization may be achieved by placing planer inverted-F antennas 104 and 105 at right angles to each other, where they may meet (e.g., at common grounding element 103) near a corner of the apparatus's 200 PCB 201. For example, as shown in FIG. 2, planar inverted F antenna 104 is polarized along x-axis 251 (corresponding to horizontal polarization) while planar inverted-F antenna 105 is polarized along y-axis 252 (corresponding to vertical polarization). However, if apparatus 200 is positioned differently with respect to axes 251-253, the polarization of antennas 104 and 105 correspondingly changes while quadrature polarization is preserved.

Antenna feed locations and/or the lengths of planer elements 104 and 105 may be adjusted independently to form antennas 101 and 102 that operate in the same or different frequency bands. Also, the antenna feed impedances may be adjusted independently by adjusting the spacings between the planer elements 104 and 105 and PCB ground plane 202. For example, PCB ground plane 202 may be removed (e.g., at etched foil section 203) so that PCB ground plane 202 extends up to a determined distance adjacent to first planar element 104 to obtain a predetermined (e.g., desired) feed impedance for first inverted-F antenna 101, where the determined distance may be calculated based on the predetermined feed impedance.

FIG. 3 shows an example printed circuit board (PCB) 301 (which may, along with its antenna assembly, be used in apparatus 200) in an upright orientation with an antenna assembly comprising inverted-F antennas 101 and 102. (Azimuth is the X-Z plane) PCB 301 may also assume other orientations, for example, a horizontal orientation. With some embodiments, PCB 301 may pivot on a mount between upright and horizontal orientations based on a user's needs. In the particular orientation shown in FIG. 3, inverted-F antenna 101 may be considered to be a top-mounted antenna and inverted-F antenna 102 may be referred to as a side-mounted antenna. However, in other orientations, this designation may be reversed.

As shown in FIG. 3, the ground plane of PCB 301 extends to a parallel edge of PCB 301, where antennas 101 and 102 are located outside the parameter of PCB 301. Consequently, there may be a gap 351 between planar elements 104 and 105 of inverted-F antennas 101 and 102, respectively, so that the spacing between ground and the antenna is, correspondingly, the distance of gap 350.

Figure 3A:
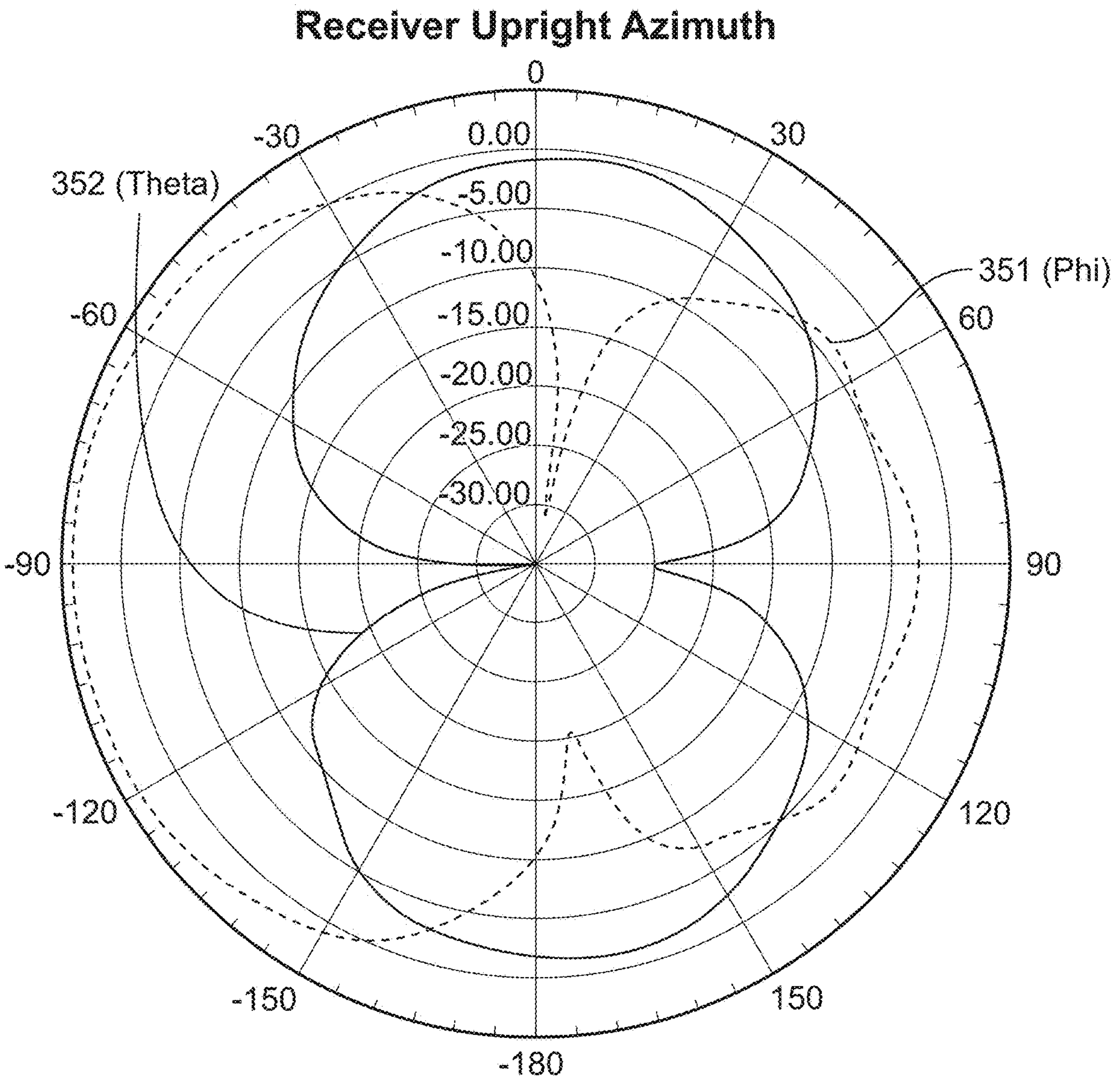
FIG. 3A shows an example of component phi (φ) and theta (θ) gain values of a modeled antenna gain pattern over all angles of theta (θ) at 2.45 GHz for the top-mounted antenna 101 shown in FIG. 3 in accordance with one or more aspects described herein.

FIG. 3A shows an example of component values 351 phi (φ) and 352 theta (θ) of a modeled antenna gain pattern over all angles of theta (θ), respectively, at 2.45 GHz for top-mounted antenna 101 shown in FIG. 3. FIG. 3C shows an example of component values 353 phi (φ) and 354 theta (θ) of a modeled antenna gain pattern over all angles of theta (θ), respectively, at 2.45 GHz for side-mounted antenna 102 shown in FIG. 3. Because the rectangular shape of PCB 301 provides a different radiation pattern for top-mounted antenna 101 and side-mounted antenna 102, the gain components shown in FIGS. 3A and 3C have different characteristics.

Figure 3B:
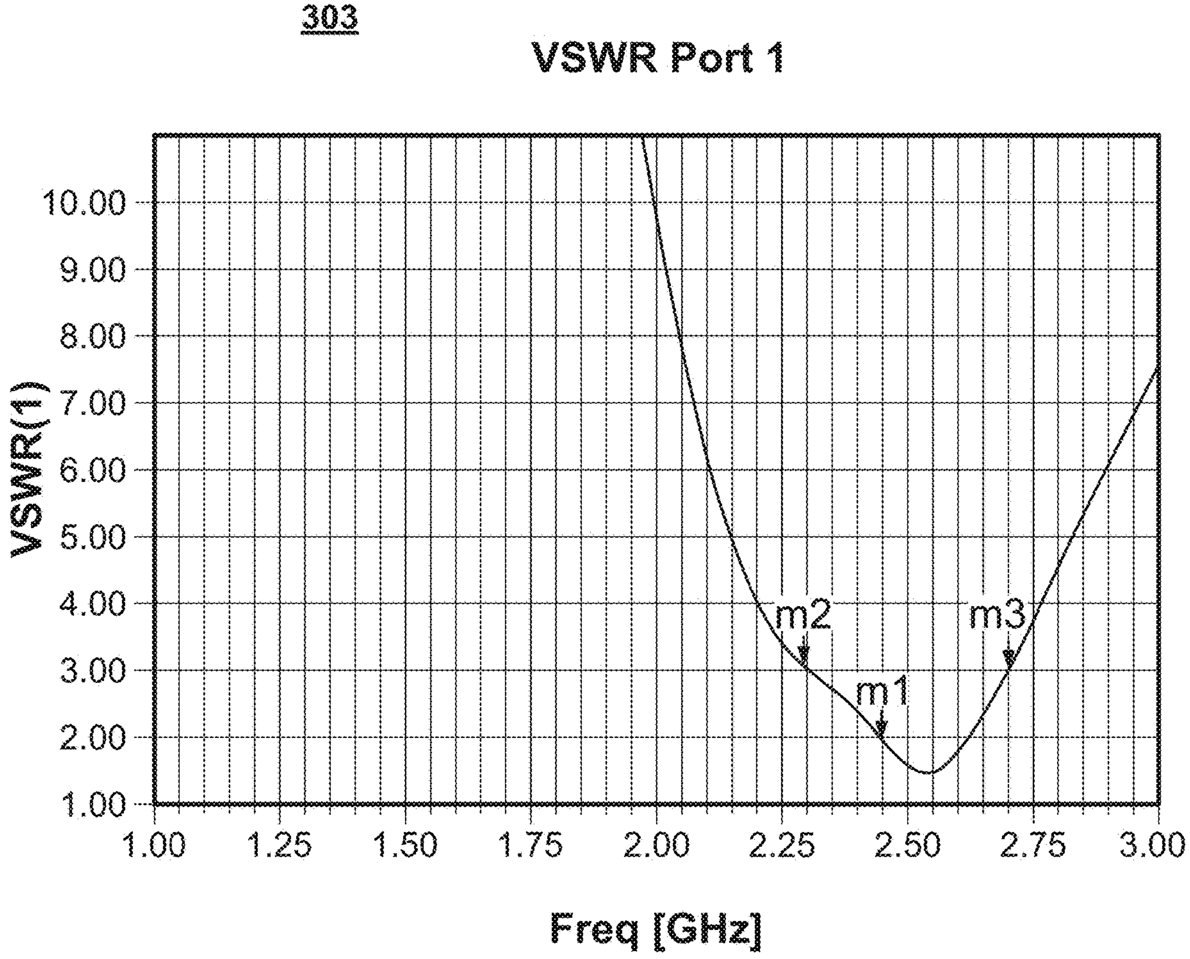
FIG. 3B shows an example of a modeled plot of the voltage standing wave ratio (VSWR) for the top-mounted antenna shown in FIG. 3 in accordance with one or more aspects described herein.
Figure 3C:
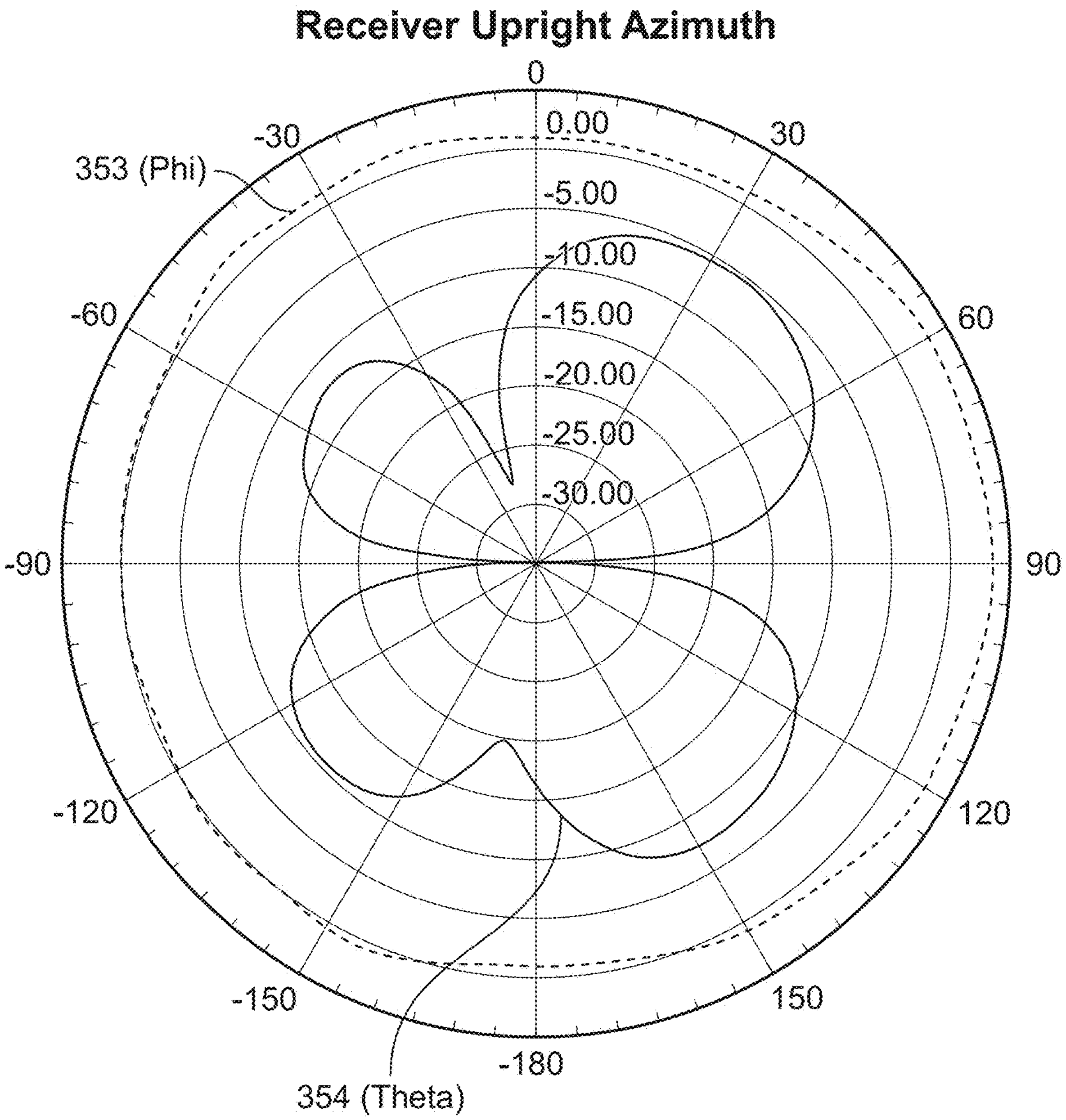
FIG. 3C shows an example of component phi (φ) and theta (θ) gain values of a modeled antenna gain pattern over all angles of theta (θ) at 2.45 GHz for the side-mounted antenna shown in FIG. 3 in accordance with one or more aspects described herein.
Figure 3D:
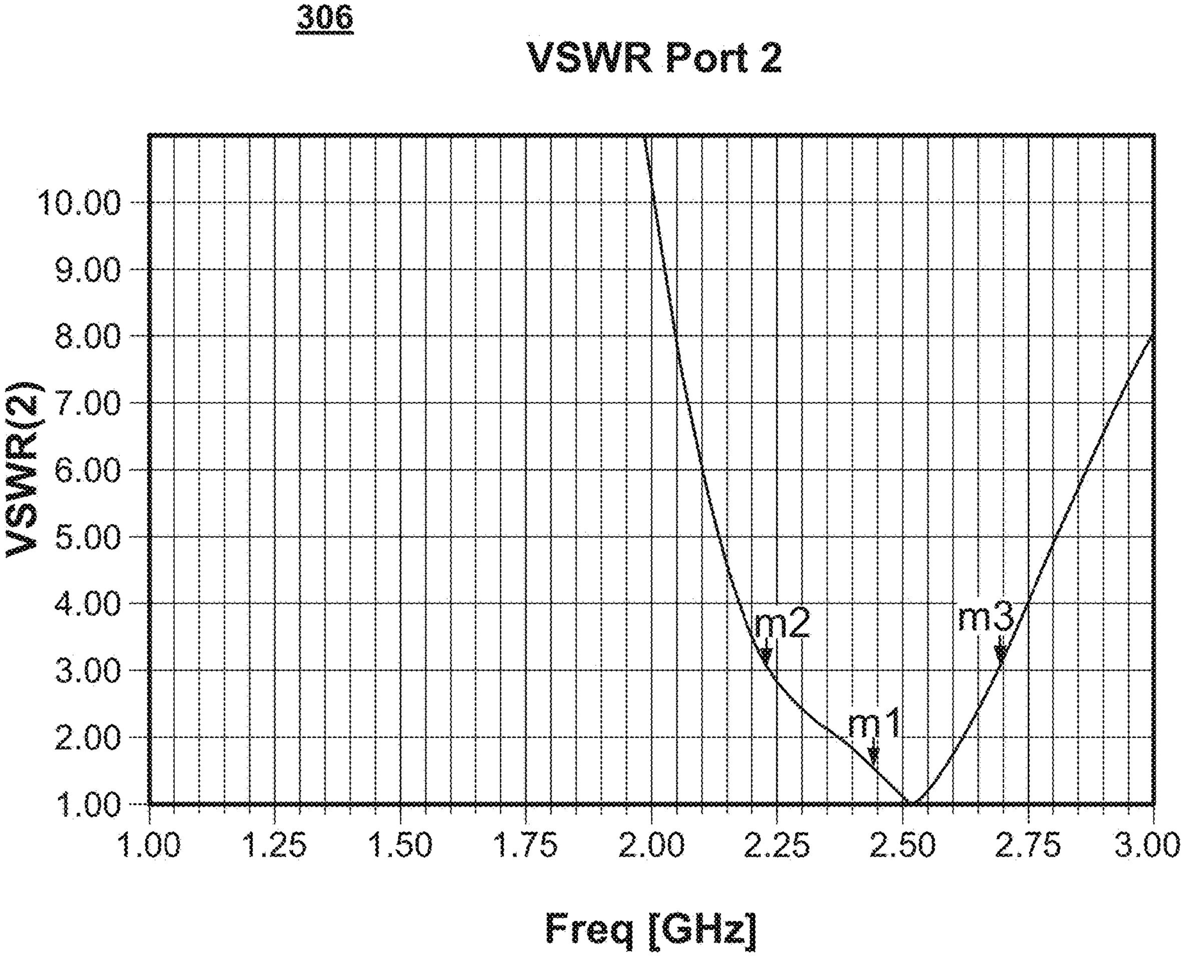
FIG. 3D shows an example of a modeled plot of the voltage standing wave ratio (VSWR) for the side-mounted antenna shown in FIG. 3 in accordance with one or more aspects described herein.

FIGS. 3B and 3D show corresponding modeled plots 303 and 304 of the voltage standing wave ratio (VSWR) of top-mounted antenna 101 and side-mounted antenna 102, respectively.

Figure 4:
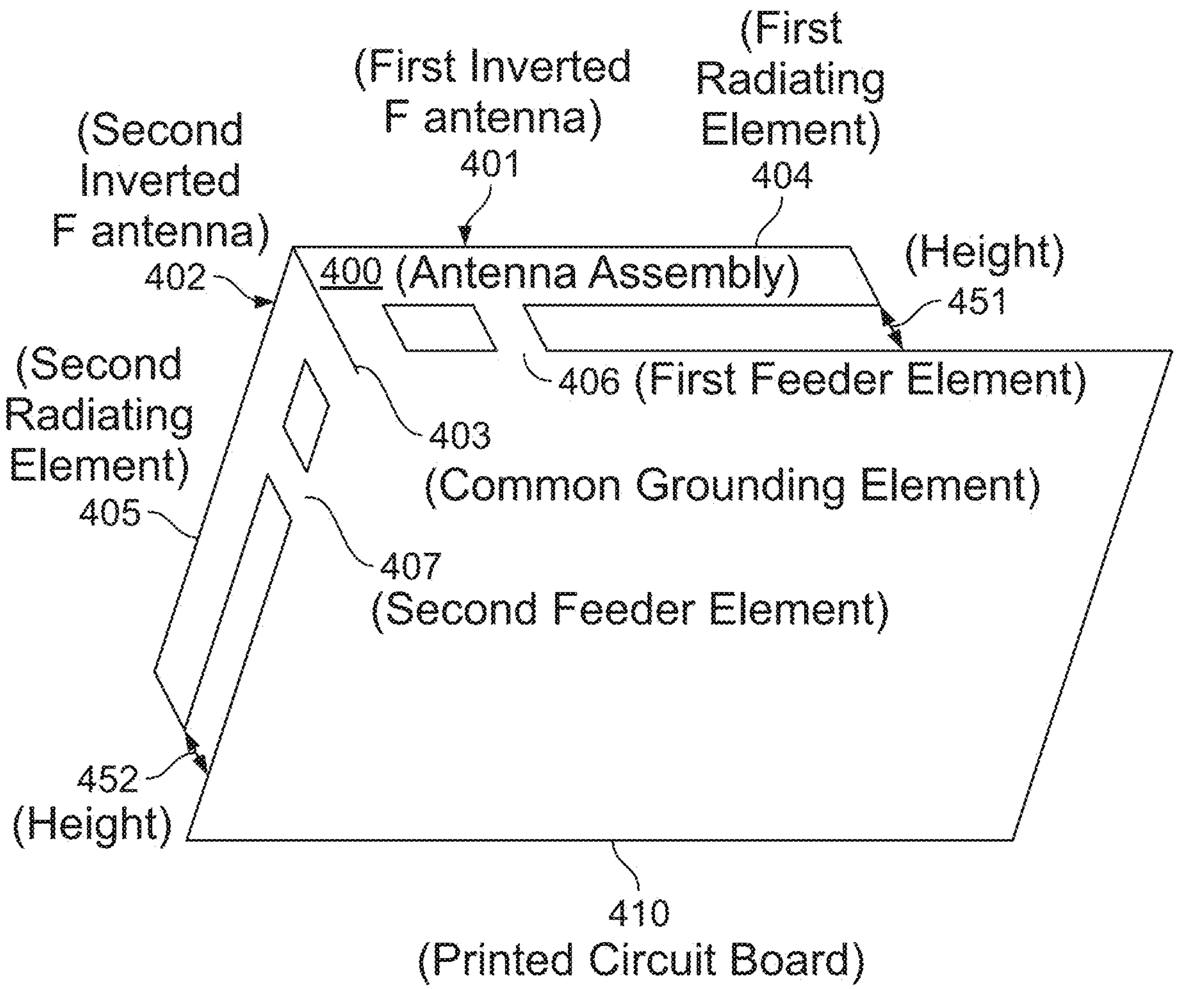
FIG. 4 shows an example of an antenna assembly mounted to a printed circuit board (PCB) in accordance with one or more aspects described herein.

FIG. 4 shows an example antenna assembly 400 mounted to printed circuit board (PCB) 410. PCB 410 and its antenna assembly that may be used in apparatus 200. A first inverted-F antenna 401 may comprise a first planar element 404 and a first feeder element 406, and a second inverted-F antenna 402 may comprise a second planar element 405 and a second feeder element 407. First and second inverted-F antennas 401 and 402 may be joined together by common grounding element 403.

Antenna assembly 400 is similar to antenna assembly 100. However, planar elements 404 and 405 (which may be referred to as upper arms) may support different configurations (such as the configuration shown in FIG. 1). For example, as shown in FIG. 4, planar elements 404 and 405 extend only to heights 451 and 452, respectively, above PCB 410, where heights 451 and 452 may or may not be the same. Because antenna assembly 400 may support embodiments with different heights 451 and 452, planar elements 404 and 405 may extend to or beyond a parallel edge of PCB 410 (similar to planar elements 104 and 103 as shown in FIG. 2).

Antenna assembly 400 may be placed along/inside/outside the perimeter of PCB 410. Also, common grounding element 403 has a sharp bend of approximately 90 degrees (rather than a curve) to conform to the corner of PCB 410. However, antenna assembly 400 may support embodiments with different corner configurations.

The feed impedance of inverted-F antennas 401 and 402 may be adjusted by varying the distances of feeder elements 406 and 407, respectively, from common grounding element 403.

The antenna assembly in any of the examples described herein may be configured as a multiband, multi-feed antenna assembly (supporting two antennas) with quadrature radiation polarization patterns. One of the antennas may operate in a first frequency band, such as a Wi-Fi band (for example, 5.8 GHz), while the other antenna may simultaneously operate in a second frequency band, such as a frequency band that supports Bluetooth operation (for example, in the 2.4 GHz band). Moreover, the antenna assembly may be configured such that each of the two antennas may simultaneously operate at different frequencies or at the same frequency for diversity applications (e.g., to provide diversity transmission and/or diversity reception).

Figure 5:
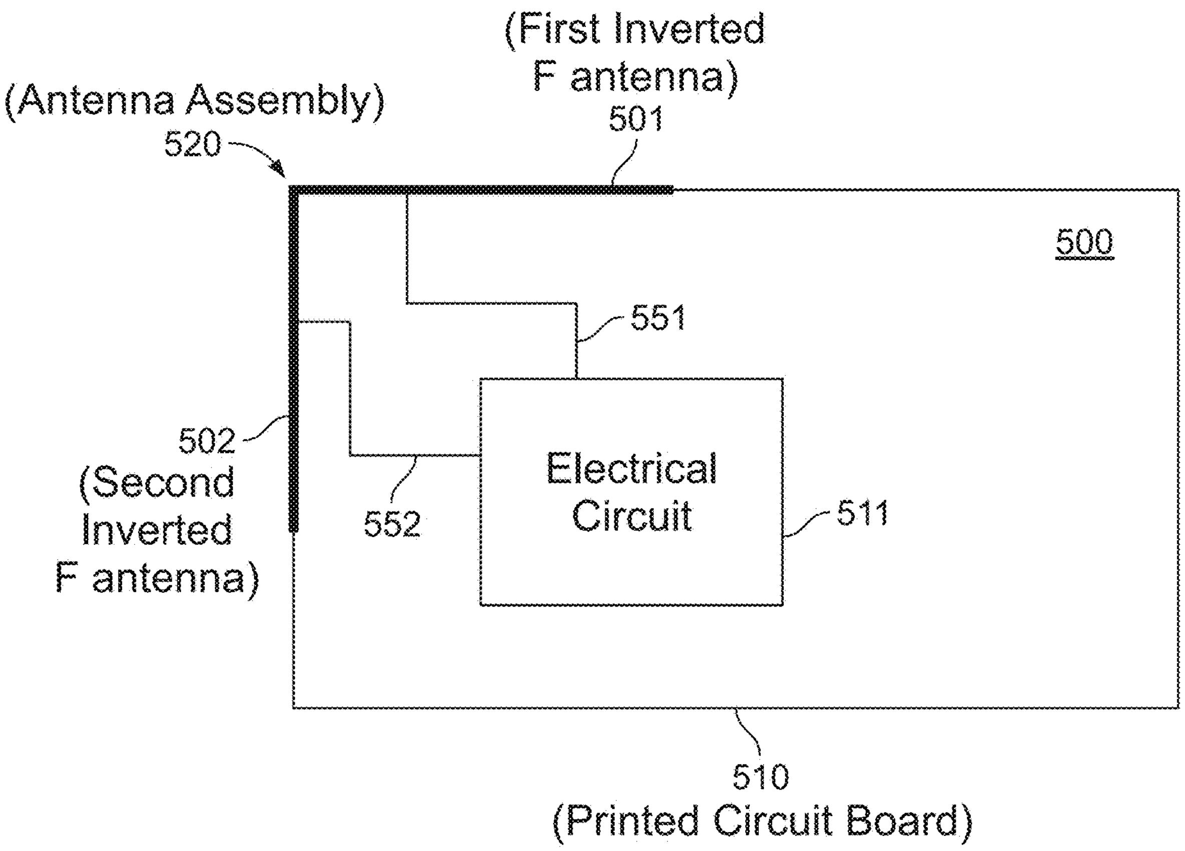
FIGS. 5-7 show various examples of wireless apparatuses in accordance with one or more aspects described herein.
Figure 6:
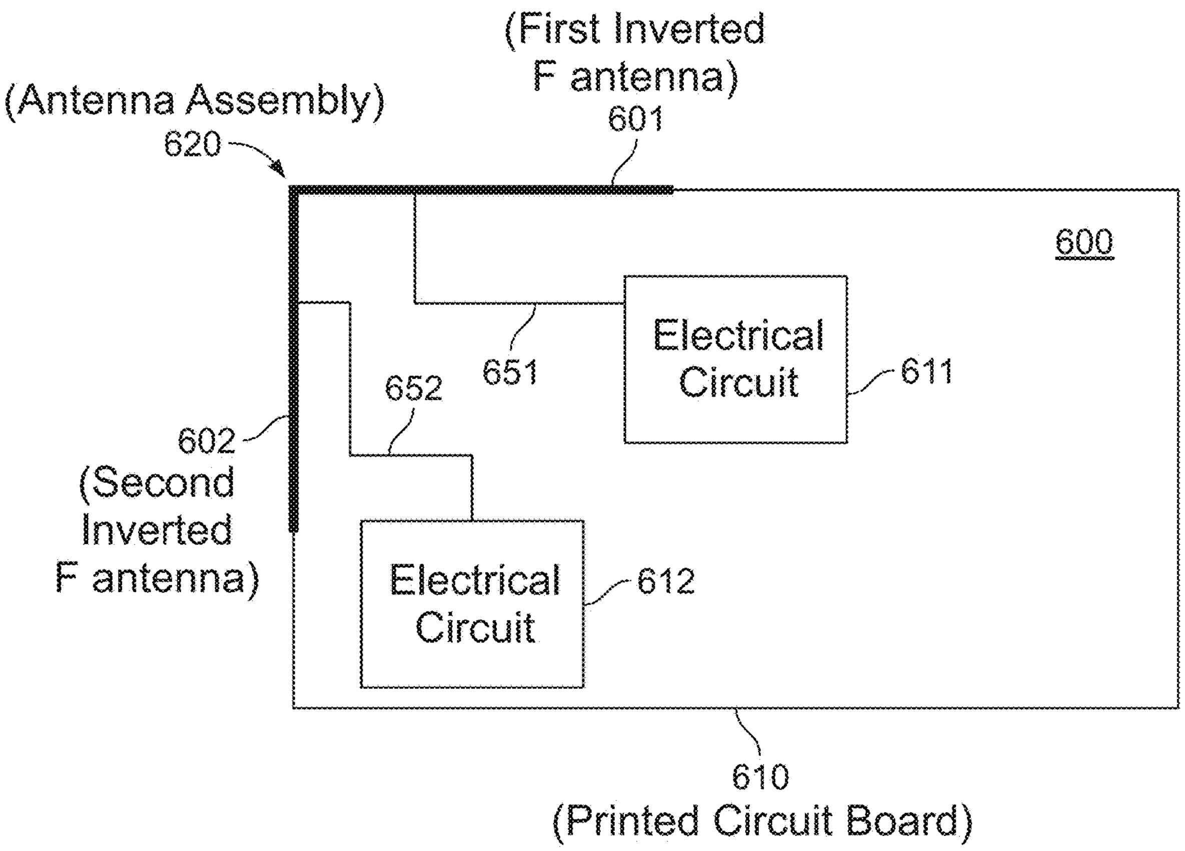
Figure 7:
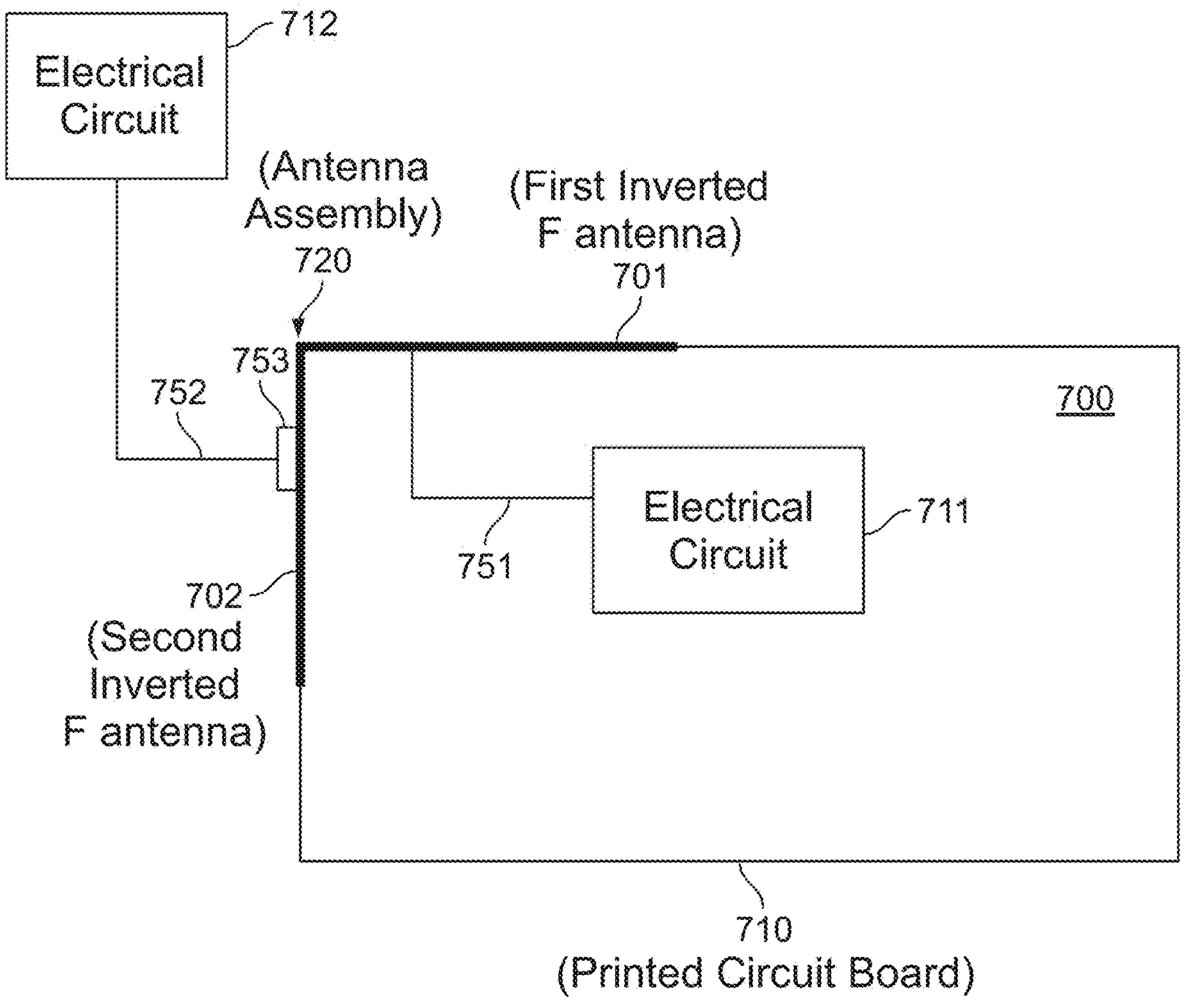

FIGS. 5-7 show example wireless apparatuses (for example, a wireless receiver or wireless microphone apparatus). Referring to FIG. 5, wireless apparatus 500 comprises an electrical circuit 511 and an antenna assembly 520, where antenna assembly 520 further includes a first inverted-F antenna 501 and a second inverted-F antenna 502 and where electrical circuit 511 is electrically mounted to PCB 510. The electrical circuit provides (transmits) and/or obtains (receives) a signal into/from antennas 501 and 502 via electrical connections 551 and 552, respectively. The wireless apparatus 500 may be an example of wireless apparatus 200. Likewise, the PCB 510 may be the same PCB as PCB 201 or 301, and the antenna assembly 520 may be the same as the antenna assemblies in any of the other examples provided herein.

Electrical connections 551 and 552 may each comprise a PCB trace that is electrically coupled to a different feeder element (for example, feeder elements 106 and 107 as shown in FIG. 1, which may be feeder elements of antennas 501 and 502, respectively).

Electrical circuit 511 may support various wireless services. For example, electrical circuit 511 may comprise one or more integrated circuits and/or discrete electrical components for a wireless microphone, where the wireless microphone may be an apparatus that comprises electrical circuit 511, PCB 500, and/or antenna assembly 520. The wireless microphone may include a transmitter that generates one or more RF signals that are transmitted via antennas 501 and 502 at the same or different frequencies. Consequently, the wireless microphone may support transmit diversity in concert with an associated microphone system.

Referring to FIG. 6, an example wireless apparatus 600 (which may be an example of wireless apparatus 200 or 500) comprises an electrical circuit 611, an electrical circuit 612, and an antenna assembly 620, where antenna assembly 620 further includes a first inverted-F antenna 601 and a second inverted-F antenna 602 and where electrical circuit 611 and electrical circuit 612 are electrically mounted to a PCB 610. Electrical circuit 611 and electrical circuit 612 transmit and or receive signals via inverted-F antennas 601 and 602, respectively, via connections 651 and 652, respectively.

Electrical circuit 611 may support, for example, a wireless microphone transmitter while electrical circuit 612 may support, for example, an integrated Bluetooth transceiver for mobile wireless audio/video and recording applications.

First and second inverted-F antennas 601 and 602 may be configured for the same or different frequency bands. Even when configured for the same frequency band (for example, 2.4 GHz), electrical circuit 611 and electrical circuit 612 may operate on different frequency channels within the common frequency band.

The apparatus configuration for FIG. 7 is similar to FIG. 6; however, electrical circuit 712 may be exterior to (for example, connecting a second inverse F antenna 702 of an antenna assembly 720 via a cable 752 and/or a connector 753) or mounted to a wireless apparatus 700. Wireless apparatus 700 may be an example of wireless apparatus 200, 500, or 600. Similar to FIG. 6, an electrical circuit 711, which is mounted on PCB 710, is connected to first inverse F antenna 701 through a connection 751.

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Exemplary Clauses

1. An antenna assembly for a wireless apparatus comprising:
   a first inverted-F antenna comprising a first planar element and a first feeder element, wherein the first planar element is located on a first plane and wherein the first inverted-F antenna is configured to accept a first RF signal from a printed circuit board (PCB); and
   a second inverted-F antenna comprising a second planar element and a second feeder element, wherein the second planar element is located on a second plane, wherein the second inverted-F antenna is configured to accept a second RF signal from the PCB, and wherein the first and second planes are perpendicular to each other,
   wherein the first and second inverted-F antennas further comprise and share a common grounding element, wherein the common grounding element joins the first and second inverted-F antennas and electrically connects the first and second planar elements to a ground plane of the PCB.
2. The antenna assembly of clause 1, wherein the first planar element extends to a parallel edge of the PCB.
3. The antenna assembly of clause 2, wherein the second planar element extends to the parallel edge of the PCB.
4. The antenna assembly of clause 1, wherein the first and second RF signals operate in first and second frequency bands, respectively.
5. The antenna assembly of clause 4, wherein the first and second frequency bands are different.
6. The antenna assembly of clause 4, wherein the first and second frequency bands are identical.
7. The antenna assembly of clause 5, wherein the first frequency band comprises 2.4 GHz and the second frequency band comprises 5.8 GHz.
8. The antenna assembly of clause 4, wherein the first and second frequency bands overlap with each other.
9. The antenna assembly of clause 1, wherein the first and second inverted-F antennas together comprise a single conductive element.
10. The antenna assembly of clause 9, wherein the single conductive element comprises a single metal piece.
11. An antenna assembly for a wireless apparatus comprising:

a first inverted-F antenna comprising a first planar element and a first feeder element, wherein the first planar element is located on a first plane and wherein the first inverted-F antenna is configured to accept a first RF signal from a printed circuit board (PCB) and wherein the first planar element extends from above the PCB to at least a parallel edge of the PCB;

a second inverted-F antenna comprising a second planar element and a second feeder element, wherein the second planar element is located on a second plane, wherein the second inverted-F antenna is configured to accept a second RF signal from the PCB, and wherein the first and second planes are perpendicular to each other;

the first and second inverted-F antennas further comprising and sharing a common grounding element, wherein the common grounding element joins the first and second inverted-F antennas and is configured to electrically connect the first and second planar element to a ground plane on the PCB; and wherein the first and second inverted-F antennas are located on a single metal piece.

12. The antenna assembly of clause 11, wherein the second planar element extends from above the PCB to the parallel edge of the PCB.

13. The antenna assembly of clause 11, wherein the first and second RF signals operate in first and second frequency bands, respectively.

14. The antenna assembly of clause 13, wherein the first and second frequency bands are different.

15. The antenna assembly of clause 13, wherein the first and second frequency bands overlap with each other.

16. The antenna assembly of clause 13, wherein the first and second frequency bands are identical.

17. A wireless apparatus comprising:

a first inverted-F antenna comprising a first planar element and a first feeder element, wherein the first planar element is located on a first plane and wherein the first inverted-F antenna is configured to accept a first RF signal from a printed circuit board (PCB) for a first frequency band;

a second inverted-F antenna comprising a second planar element and a second feeder element, wherein the second planar element is located on a second plane, wherein the second inverted-F antenna is configured to accept a second RF signal from the PCB for a second frequency band, and wherein the first and second planes are perpendicular to each other; and the first and second inverted-F antennas further comprising and sharing a common grounding element, wherein the common grounding element joins the first and second inverted-F antennas and electrically connects the first and second planar elements to a ground plane on the PCB; and a printed circuit board (PCB) containing an electrical circuit providing a wireless communication channel over the first frequency band, wherein the electrical circuit supports a wireless service.

18. The wireless apparatus of clause 17, wherein the second inverted-F antenna is connected to a first electrical circuit, wherein the first electrical circuit is operational in the second frequency band and wherein the first electrical circuit utilizes the second inverted-F antenna for providing another communication channel.

19. The wireless apparatus of clause 17, wherein the second inverted-F antenna is connected to the electrical circuit for supporting the wireless service and wherein the first and second inverted-F antennas provide diversity operation for the wireless service.

20. The wireless apparatus of clause 17, wherein the first planar element extends to a surface of the PCB.

21. The wireless apparatus of clause 20, wherein the second planar element extends to the surface of the PCB.

22. The wireless apparatus of clause 17 comprising a second electrical circuit, wherein the second inverted-F antenna is connected to the second electrical circuit.

23. The wireless apparatus of clause 17, wherein the first and second planes are perpendicular to the PCB.

24. The wireless apparatus of clause 17, wherein the common grounding element comprises a curved portion and wherein the curved portion conforms to the wireless apparatus.

25. The wireless apparatus of clause 17, wherein a section of the ground plane is removed within a distance adjacent to the first planar element.

26. The wireless apparatus of clause 25, wherein the distance determines a predetermined impedance for the first inverted-F antenna.

27. The wireless apparatus of clause 17, wherein the first and second inverted-F antennas are located on a single metal piece and are located on an outside perimeter of a corner of the PCB.

28. An antenna assembly for a wireless apparatus comprising:

a first inverted-F antenna configured to radiate along a first plane and configured to accept a first RF signal from a printed circuit board (PCB), wherein the first RF signal occurs in a first frequency band;

a second inverted-F antenna configured to radiate along a second plane and configured to accept a second RF signal from the PCB, wherein the first and second planes are perpendicular to each other and wherein the second RF signal occurs in a second frequency band; and the first inverted-F antenna electrically joining the second inverted-F antenna.

29. The antenna assembly of clause 28, the first and second inverted-F antennas comprising a common grounding element, the common grounding element joining the first and second inverted-F antennas, and the common grounding element electrically connecting the first and second planar elements to a ground plane of the PCB.

30. The antenna assembly of clause 29, the common grounding element conforming to a shaped portion of the wireless apparatus.

31. The antenna assembly of clause 28, wherein the first inverted-F antenna comprises a first planar element and a first feeder element, wherein the first RF signal is coupled to the first feeder element, and wherein the first planar element extends to a parallel edge of the PCB.

32. The antenna assembly of clause 31, wherein the second inverted-F antenna comprises a second planar element and a second feeder element, wherein the second RF signal is coupled to the second feeder element, and wherein the second planar element extends to a parallel edge of the PCB.

33. The antenna assembly of clause 28, wherein the first and second inverted-F antennas together comprise a single conductive element.

34. The antenna assembly of clause 33, wherein the single conductive element comprises a single metal piece.

35. The antenna assembly of clause 28, wherein the first and second frequency bands overlap with each other.

36. The antenna assembly of clause 28, wherein the first and second frequency bands are different.

37. The antenna assembly of clause 28, wherein the first and second frequency bands are identical.

38. A wireless microphone comprising:

an antenna structure having a first and second antenna components, wherein the first and second antenna components share a common grounding element.

39. The wireless microphone of clause 38, further comprising:

an electrical circuit configured to electrically connect to at least one of the first and second antenna components in order to communicate wirelessly through the at least one of the first and second antenna components.

40. The wireless microphone of clause 39, wherein the electrical circuit processes a first radio frequency (RF) signal associated with the at least one of the first and second antenna components.

41. The wireless microphone of clause 40, wherein the electrical circuit processes a second radio frequency (RF) signal associated with the at least one of the first and second antenna components.

42. The wireless microphone of clause 41, wherein the electrical circuit provides a diversity capability based on the first and second RF signals.

43. The wireless microphone of clause 42, wherein the first and second antenna components operate at first and second frequency bands, respectively.

44. The wireless microphone of clause 41, wherein the electrical circuit transmits the first RF signal to the first antenna component and receives the second RF signal from the second antenna component.

45. The wireless microphone of clause 38, wherein the first and second antenna components comprise first and second inverted-F antennas, respectively.

46. The wireless microphone of clause 38, wherein the first and second antenna components are situated along first and second planes and wherein the first and second planes are perpendicular to each other.

47. The wireless microphone of clause 43, wherein the first and second frequency bands are the same.

48. A wireless microphone comprising a transmitter and an antenna structure configured to communicate using transmission diversity.

49. The wireless microphone of clause 48, wherein the antenna structure is configured to communicate using the transmission diversity via a plurality of simultaneous transmissions.

50. The wireless microphone of clause 49, wherein the transmission diversity is over a plurality of different frequency bands.

51. The wireless microphone of clause 50, wherein the plurality of different frequency bands comprises a wi-fi band and a Bluetooth band.

52. The wireless microphone of clause 48, wherein the antenna structure comprises a first antenna element configured to operate in a wi-fi band and a second antenna element configured to operate in a Bluetooth band.

53. The wireless microphone of clause 48, wherein the antenna structure comprises a first antenna element and a second antenna element that are electrically connected to each other.

54. The wireless microphone of clause 53, wherein the first antenna element is configured to operate at a first frequency band and the second antenna element is configured to operate at a different second frequency band simultaneously with the first antenna element.

55. The wireless microphone of clause 48, wherein the antenna structure comprises a first antenna element and a second antenna element that share a common ground.

56. The wireless microphone of clause 55, wherein the first antenna element is configured to operate at a first frequency band and the second antenna element is configured to operate at a different second frequency band simultaneously with the first antenna element.

57. The wireless microphone of clause 48, wherein the antenna structure comprises a first antenna element and a second antenna element oriented orthogonally to the first antenna element, wherein the first antenna element and the second antenna element are configured to simultaneously transmit different transmissions.

58. The wireless microphone of clause 49, wherein the transmission diversity is over a same frequency band.

What is claimed is:

1. An antenna assembly comprising:

a printed circuit board (PCB);

a first inverted-F antenna, perpendicular to a first edge of the PCB, extending along a first plane, and configured to receive a first RF signal, for wireless communication via a first electrical connection to the PCB, wherein the first RF signal is for operation in a first frequency band; and a second inverted-F antenna, perpendicular to a second edge of the PCB, extending along a second plane, and configured to receive a second RF signal, for wireless communication via a second electrical connection to the PCB, wherein the first and second planes are perpendicular to each other and wherein the second RF signal is for operation in a second frequency band, wherein the first inverted-F antenna and the second inverted-F antenna are disposed at a corner of the PCB, and wherein a common grounding element electrically connects the first inverted-F antenna with the second inverted-F antenna to a ground plane on the PCB.

2. The antenna assembly of claim 1, wherein the first and second inverted-F antennas each comprise at least a portion of the common grounding element.

3. The antenna assembly of claim 2, wherein the first and second inverted-F antennas comprise respective first and second planar elements, and wherein the common grounding element electrically connects the first and second planar elements to the ground plane on the PCB.

4. The antenna assembly of claim 1, wherein the first inverted-F antenna comprises a first planar element and a first feeder element, wherein the first feeder element is configured to receive the first RF signal, and wherein the first planar element extends to a parallel edge of the PCB.

5. The antenna assembly of claim 4, wherein the second inverted-F antenna comprises a second planar element and a second feeder element, wherein the second feeder element is configured to receive the second RF signal, and wherein the second planar element extends to a parallel edge of the PCB.

6. The antenna assembly of claim 1, wherein the first and second inverted-F antennas together comprise a single conductive element.

7. The antenna assembly of claim 6, wherein the single conductive element comprises a single metal piece.

8. A wireless apparatus comprising:
a printed circuit board (PCB);
a first inverted-F antenna comprising:
a first planar element perpendicular to the PCB; and
a first feeder element,
wherein the first planar element is located on a first plane and wherein the first inverted-F antenna is configured to receive a first RF signal, for communication via a first electrical connection to the PCB, at a first frequency band;
a second inverted-F antenna comprising:
a second planar element perpendicular to the PCB; and
a second feeder element,
wherein the second planar element is located on a second plane, wherein the second inverted-F antenna is configured to receive a second RF signal, for communication via a second electrical connection to the PCB, at a second frequency band, and wherein the first and second planes are perpendicular to each other;
the first and second inverted-F antennas further comprising and sharing a common grounding element, wherein the common grounding element joins the first and second inverted-F antennas and electrically connects the first and second planar elements to a ground plane on the PCB; and
wherein the PCB comprises an electrical circuit providing a wireless communication channel over the first frequency band, wherein the electrical circuit supports a wireless service.

9. The wireless apparatus of claim 8, wherein the electrical circuit comprises at least a first electrical circuit, and wherein the second inverted-F antenna is connected to the first electrical circuit, wherein the first electrical circuit is operational in the second frequency band, and wherein the first electrical circuit utilizes the second inverted-F antenna for providing another communication channel.

10. The wireless apparatus of claim 8, wherein the second inverted-F antenna is connected to the electrical circuit for supporting the wireless service, and wherein the first and second inverted-F antennas provide diversity operation for the wireless service.

11. The wireless apparatus of claim 8, wherein the first planar element extends to a surface of the PCB.

12. The wireless apparatus of claim 11, wherein the second planar element extends to the surface of the PCB.

13. The wireless apparatus of claim 8, further comprising a second electrical circuit, wherein the second inverted-F antenna is connected to the second electrical circuit.

14. The wireless apparatus of claim 8, wherein the first and second planes are perpendicular to the PCB.

15. The wireless apparatus of claim 8, wherein a section of the ground plane is removed within a distance adjacent to the first planar element.

16. The wireless apparatus of claim 15, wherein the distance determines a predetermined impedance for the first inverted-F antenna.

17. The wireless apparatus of claim 8, wherein the first and second inverted-F antennas are located on a single metal piece and are located on an outside perimeter of a corner of the PCB.

18. An antenna assembly comprising:
a first inverted-F antenna along a first plane, perpendicular to a first edge of a printed circuit board (PCB), and configured to receive a first RF signal in a first frequency band for wireless communication via a first electrical connection to the PCB; and
a second inverted-F antenna along a second plane, perpendicular to a second edge of the PCB, and configured to receive a second RF signal in a second frequency band, different from the first frequency band, for wireless communication via a second electrical connection to the PCB; and
a common grounding element that electrically connects the first and second inverted-F antennas to a ground plane on the PCB at a corner such that the first inverted-F antenna along the first plane is perpendicular to the second inverted-F antenna along the second plane.

19. The antenna assembly of claim 18, further comprising the PCB.

20. The antenna assembly of claim 18, wherein the first edge of the PCB is different from the second edge of the PCB, and wherein the first plane is perpendicular to the second plane.

21. The antenna assembly of claim 18, wherein the first and second inverted-F antennas comprise respective first and second planar elements, and wherein the common grounding element electrically connects the first and second planar elements to the ground plane on the PCB.

22. The antenna assembly of claim 18, wherein the first inverted-F antenna comprises a first planar element and a first feeder element, wherein the first feeder element is configured to receive the first RF signal, and wherein the first planar element extends along the first edge of the PCB.

23. The antenna assembly of claim 22, wherein the second inverted-F antenna comprises a second planar element and a second feeder element, wherein the second feeder element is configured to receive the second RF signal, and wherein the second planar element extends along the second edge of the PCB.

24. The antenna assembly of claim 18, wherein the first and second inverted-F antennas together comprise a single conductive element.

25. The antenna assembly of claim 24, wherein the single conductive element comprises a single metal piece.

* * * * *